United States Patent [19]

Fournel et al.

[11] 3,933,776

[45] Jan. 20, 1976

[54] BULK POLYMERIZATION OF VINYL CHLORIDE

[75] Inventors: Francis Fournel, Chauny; Salomon Soussan, St-Fons, both of France

[73] Assignee: Rhone-Progil, Courbevoie, France

[22] Filed: Apr. 2, 1974

[21] Appl. No.: 457,193

[30] Foreign Application Priority Data

Apr. 3, 1973  France .............................. 73.11938

[52] U.S. Cl. ........................... 260/92.8 R; 260/87.1
[51] Int. Cl.$^2$ ...................... C08F 3/30; C08F 15/30
[58] Field of Search ....................... 260/92.8 R, 87.1

[56] References Cited
UNITED STATES PATENTS

| | | | |
|---|---|---|---|
| 3,742,091 | 6/1973 | Moberly | 260/879 |
| 3,759,885 | 9/1973 | Thomas | 260/92.8 R |
| 3,793,259 | 2/1974 | Brinkmann | 260/78.5 R |

*Primary Examiner*—Christopher A. Henderson
*Attorney, Agent, or Firm*—McDougall, Hersh & Scott

[57] ABSTRACT

A process for preparing polymers and copolymers containing vinyl chloride by bulk polymerization which includes feeding to a reaction zone of a vessel maintained at polymerization temperature ($t_1$) a solution (A) comprising monomeric material to be polymerized and at least one polymerization initiator, solution (A) being prepared continuously immediately before being fed to the reaction zone by mixing a constituent (B) comprising at least 50% of the monomeric material at a temperature ($t_2$) which is within 10°C of $t_1$, and a solution (C) of the initiator of initiators in an organic solvent which would include the remainder, if any, of the monomeric material, and in which, when the polymerization reaction is carried out in a two stage polymerization including a first pre-polymerization and a subsequent polymerization, the pre-polymerization reaction is carried out under a high stage of agitation while the polymerization step is carried out at a lower stage of agitation.

8 Claims, No Drawings

BULK POLYMERIZATION OF VINYL CHLORIDE

The present invention relates to improvements in the preparation in bulk of polymers and copolymers based on vinyl chloride and also to the resulting polymers and copolymers.

Hitherto polymerization in bulk of monomeric compositions based on vinyl chloride has been effected by introducing the entire amount of the polymerization initiator or initiators, with the monomeric material, into the reactor.

This technique has several disadvantages among which may be mentioned:

The necessity to cool the reactor before introduction of the polymerization initiators.

Risk of decomposition of the polymerization initiators can result either in the presence of crust, which is still warm due to insufficient cleaning or to an undesired re-heating of the jacket of the reactor.

The requirement for a heating step in order to bring the reaction medium, contained in the reactor, to the temperature for polymerication. This has the following results:

Lengthening of the duration of the polymerization operation, which increases as the size of the reactor increases;

Initiation of polymerization at a temperature which increases during the heating stage, which has a bad effect on the homogeneity of the polymer obtained;

Formation of crust on the warm wall of the reactor;

The necessity to resort to the use of polymerization initiators having a high rate of decomposition to facilitate heating of the reaction medium, which generally entails formation of crust and undesirable fine particles of polymer.

It is an object of this invention to provide a process which does not have the disadvantages mentioned above.

According to one aspect of the present invention, there is provided a process for preparing polymers and copolymers containing vinyl chloride by bulk polymerization, which comprises feeding to a reaction zone of a vessel maintained at the temperature $(t_1)$ required for polymerization a solution (A) comprising monomeric material to be polymerized and at least one polymerization initiator, solution (A) being prepared continuously immediately before being fed to the reaction zone by mixing a constituent (B) comprising at least 50% of the monomeric material at a temperature $(t_2)$, close to $t_1$, and a solution (C) of the initiator or initiators in an organic solvent comprising the remainder, of any, of the monomeric material.

It has been surprisingly found that it is possible to prepare the solution A continuously outside the reaction zone without encountering premature polymerization of the monomeric composition, by operating in such a manner that the time of contact between the constituent B and the solution C of the initiator or initiators for polymerization and the arrival of the solution A in the reaction zone is small. This time should not exceed a maximum value which is smaller, other things being equal, as the temperature $t_2$ and the rate of decomposition of the polymerization initiator at the temperature $t_2$ are higher. It does not generally exceed 20 seconds, preferably not exceeding 10 seconds.

Preferably, the entire amount of the monomeric composition used is raised to temperature $t_2$.

In order most efficiently to carry out the process of the invention, the difference between the temperatures $t_1$ and $t_2$ should not exceed 20°C and preferably 10°C.

Heating of the fraction B of the monomeric composition to the temperature $t_2$ may be effected by any conventional means and consequently under conditions of heat exchange which are superior to those normally used (circulation of a heat exchange fluid in a jacket surrounding the reactor). It is possible, for example, to pass said monomeric composition through a tubular exchanger in which steam is condensed. This method is more advantageous as the size of the reactor is increased.

Mixing of a constituent B and the solution C may be effected by any known means, allowing such a mixture to be made very rapidly, preferably by means of a static mixer feeding the reactor.

There may be used any polymerization initiator suitable for the preparation in bulk of polymers and copolymers based on vinyl chloride, for example azo compounds such as azodiisobutyronitrile, peroxides such as lauroyl peroxide, acetylcyclohexanesulfonyl peroxide, the peroxydicarbonates such as isopropyl peroxydicarbonate, and ethyl peroxydicarbonate.

Because of the risk of explosion during their manipulation, the polymerization initiators should be used in the solid state or in solutions in an organic solvent. Organic solvents which may be used include butyl phthalate, octyl adipate, petroleum ether, hexane, trifluorotrichlorethane, and monofluorotrichloromethane.

In the case where all the polymerization initiators used are in the solid state, solution C is generally prepared by dissolution of the initiators in the complementary fraction of a monomeric composition (i.e. the fraction not used in constituent B).

In the case where at least one of the polymerization initiators used is present in solution in an organic solvent, the solution C is generally prepared by mixing said solutions, in which there are dissolved the polymerization initiators which are present in the solid state. In such instance, it is not generally necessary to use any of the monomeric composition for preparation of the solution C so that it is the entire monomeric composition which is previously heated to temperature $t_2$. Concentration of the polymerization initiators in the solution C, expressed as active oxygen equivalent, is preferably from 0.5% to 7%, advantageously 0.7% to 4% by weight. It is, however, possible to use part of the monomeric composition for preparation of the solution C and then it is only a portion B of the monomeric composition which is previously heated to temperature $t_2$.

It has been found that, using the process of the invention, the initial conditions of polymerization are accurately reproducible and a high degree of regularity occurs in the polymerization operation and in the polymers that are formed. The formation of crust on the walls of the reactor is reduced to a minimum owing to the reduced duration during which, after the start of the introduction of the solution A into the reaction zone, the maintenance of the reaction zone at the temperature of polymerization is effected by heating.

The process of the invention may be applied to various procedures for bulk polymerization of monomeric compositions based on vinyl chloride. It may be applied to single stage methods using constant speed agitation, such as described in French Patents Nos. 1,257,780 and 1,360,251.

It is also applicable to each of the stages used in the two-stage techniques described in French Patents Nos. 1,357,736, 1,382,072, 1,436,744, 1,450,464, 1,574,734 and 1,605,157. These techniques involve carrying out the operations of polymerization or copolymerization while using an agitation speed which is as high as possible during a first stage, until the degree of polymerization of the monomeric composition of the order of 7% to 15% and preferably 8% to 12%, then reducing the agitation speed, is a second stage of the reaction to a speed as low as possible, which however, remains sufficient to insure good heat exchange in the reaction medium until the end of the reaction. In these techniques, the two stages, the first effected under high agitation and the second under low agitation, are carried out either in a single autoclave or in different autoclaves, the said two stages, then referred to as prepolymerization and final polymerization, taking place in appropriate apparatus known as prepolymerizers and polymerizers. The second stage may be carried out in a reaction medium formed entirely by the monomer/polymer composition from the prepolymerization or by said monomer/polymer composition and a complementary monomer composition based on vinyl chloride, identical to or different from that used in the first stage and by one or more polymerization initiators.

When the present invention is applied to the technique of polymerization in two stages, the two stages taking place respectively in a prepolymerizer and in one or more polymerizers, and the final polymerization operation is carried out on a reaction medium formed by the monomer/polymer composition from the first stage, plus a monomeric complementary composition based on vinyl chloride and one or more initiators for polymerization, it is advantageous to introduce said monomer/polymer composition in the polymerizer or polymerizers before or at the same time as the solution A. There is thus avoided the risk of formation of a parasite population of polymer particles which are sometimes formed in the techniques which have hitherto been used, according to which transfer of the monomer/polymer composition into the polymerizers takes place after introduction of the initiator or initiators for polymerization and the complementary monomer composition based on vinyl chloride, and the polymerization initiators are in contact for a long time with the monomer composition, which may be insufficiently cooled or contain traces of a decomposition accelerator for the polymerization initiator. Also, advantageously, the final polymerization may start in a reaction medium in which perfect homogeneity is obtained without the aid of a polymerizer agitator which, being adapted to agitate the reaction medium when the latter has reached a state close to the pulverulent state, that is to say in the case of polymerization of vinyl chloride when at least 20% of the material is polymerized, is not suitable for adequate treatment of the mixture constituted by the monomer/polymer composition, the complementary monomer composition, and by the polymerization initiator or initiators.

The following examples are given by way of illustration, but not by way of limitation, of the several embodiments of the process of this invention, together with comparative examples:

The polymers obtained are characterized by AFNOR viscosity indices determined according to the Standard NFT 51013.

EXAMPLE 1

This example is given for comparison.

Into a horizontal autoclave of 500 liters capacity, provided with a jacket maintained at 14°C by circulation of cold water, and a frame stirrer rotating at 30 revolutions per minute, there are introduced:

2.6 g of active oxygen in the form of 295 g of a solution in petroleum ether of ethyl peroxydicarbonate, titrated at 0.87% by weight of active oxygen;

2.6 g of active oxygen in the form of 67 g of lauroyl peroxide;

220 kg of vinyl chloride monomer.

The autoclave is purged by degassing 20 kg of vinyl chloride.

By circulation of warm water in the jacket of the autoclave, the temperature of the reaction medium is raised to 69°C which corresponds to a gauge pressure of 11.5 bars in the autoclave. The duration of heating is 40 minutes.

After 5.5 hours of polymerization at 69°C and degassing to remove vinyl chloride which has not reacted, there is recovered with a yield of 80% a pulverulent polymer having a viscosity index of 80.

EXAMPLE 2

The same autoclave is used as in Example 1.

Into the autoclave, with the agitator rotating at 30 revolutions per minute and with the jacket maintained at 69°C by circulation of warm water, there is introduced a solution which is prepared continuously immediately before introduction into the reaction zone, in a static mixer, feeding into the autoclave by mixing of:

220 kg of vinyl chloride monomer previously heated to 70°C by passage through a tubular heat exchanger in which steam is condensed, and 5.2 g of active oxygen in the form of a solution obtained by dissolving 67 g of lauroyl peroxide in the solution of ethyl peroxydicarbonate of which the titre is indicated in Example 1.

At the end of charging, the autoclave is purged by degassing 20 kg of vinyl chloride at a reaction medium temperature of 69°C, corresponding to a gauge pressure of 11.5 bars in the autoclave.

After 5.5 hours of polymerization at 69°C and degassing of vinyl chloride which has not reacted there is obtained with a yield of 80% a pulverulent polymer of viscosity index AFNOR 80.

There is observed, compared with Example 1, a gain of time of 40 minutes in the polymerization operation.

It is also noted that the presence of crust on the wall of the autoclave is considerably less than in Example 1.

EXAMPLE 3

This example is given by way of comparison.

The same apparatus is used as in Example 1.

In the autoclave of which the jacket is maintained at 14°C by circulation of cold water and in which the agitator rotates at 30 revolutions per minute there are introduced:

0.4 g of active oxygen in the form of 20 g of a solution in butyl phthalate of acetylcyclohexanesulphonyl peroxide titrated at 2% by weight of active oxygen;

1.2 g of active oxygen in the form of 60 g of a solution in butyl phthalate of ethyl peroxydicarbonate, titrated at 2% by weight of active oxygen;

220 kg of vinyl chloride monomer.

The autoclave is pursed by degassing of 20 kg of vinyl chloride.

By circulation of warm water in the jacket of the autoclave, the temperature of the reaction medium is raised to 69°C, which corresponds to a gauge pressure of 11.5 bars in the autoclave. The duration of heating is 40 minutes.

After 45 minutes of polymerization there are introduced in the autoclave:

1.6 g of active oxygen, in the form of 80 g of the ethyl peroxydicarbonate solution of which the titre is indicated above;

2 g of active oxygen in the form of 51 g of lauroyl peroxide.

After 6.5 hours of polymerization at 69°C and degassing of the vinyl chloride which has not reacted, there is recovered with a yield of 80% a pulverulent polymer of viscosity index 80.

EXAMPLE 4

There is used the same autoclave as in Example 3.

Into the autoclave, with the agitator rotating at 30 revolutions per minute and with the jacket maintained at 69°C by circulation of warm water, there is introduced a solution which is prepared continuously immediately before its arrival in the reaction zone, in a static mixer feeding the autoclave by mixing of:

220 kg of vinyl chloride monomer previously heated to 70°C by passage through a tubular heat exchanger in which steam is condensed;

1.6 g of active oxygen in the form of the solution obtained by mixing 20 g of the acetylcyclohexanesulphonyl peroxide solution and 60 g of the ethyl peroxydicarbonate solutions of which the titres are indicated in Example 3.

At the end of charging, the autoclave is purged by degassing 20 kg of vinyl chloride; the temperature of the reaction medium is 69°C which corresponds to a gauge pressure of 11.5 bars in the autoclave.

After 45 minutes of polymerization, there are introduced into the autoclave:

1.6 g of active oxygen in the form of 80 g of the solution of ethylperoxydicarbonate of which the titre is indicated in Example 3.

2 g of active oxygen in the form of 51 g of lauroyl peroxide.

After 6.5 hours of polymerization at 69°C and degassing of vinyl chloride which has not reacted, there is obtained with a yield of 80% a pulverulent polymer of viscosity index 80.

There is observed, compared with Example 3, a gain of time of 40 minutes in the polymerization operation.

It is further noticed that the presence of crust on the wall of the autoclave is considerably reduced compared with the process of Example 3.

EXAMPLE 5

This example is given as a comparative example.

There is used the same apparatus as in Example 1.

Into the autoclave, of which the jacket is maintained at 14°C by circulation of cold water and having an agitator turning at 100 revolutions per minute, there is introduced:

6 g of active oxygen in the form of 154 g of lauroyl peroxide;

220 kg of vinyl chloride monomer.

The autoclave is purged by degassing of 20 kg of vinyl chloride.

By circulation of warm water in the jacket of the autoclave, the temperature of the reaction medium is raised to 69°C, corresponding to a gauge of pressure of 11.5 bars in the autoclave. The duration of heating is 40 minutes.

After 1 hour of polymerization the speed of rotation of the agitator is adjusted to 30 revolutions per minute.

After 6.5 hours of polymerization at 69°C and degassing of vinyl chloride which has not reacted, there is recovered with a yield of 80% of pulverulent polymer of viscosity index 80.

EXAMPLE 6

There is used the same autoclave as in Example 5.

Into the autoclave, with the agitator turning at 100 revolutions per minute and of which the jacket is maintained at 69°C by circulation of warm water, there is introduced a solution prepared continuously immediately before its arrival in the reaction zone, in a static mixer feeding the autoclave by mixing of:

220 kg of vinyl chloride monomer previously heated to 70°C by passage through a tubular exchanger in which steam is condensed;

6 g of active oxygen in the form of 850 g of a solution in petroleum ether of lauroyl peroxide having a titre of 0.7% by weight of active oxygen.

At the end of charging, the autoclave is purged by degassing of 20 kg of vinyl chloride; the temperature of the reaction medium is 69°C corresponding to a gauge pressure of 11.5 bars in the autoclave.

After 1 hour of polymerization, the speed of rotation of the agitator is adjusted to 30 revolutions per minute.

After 6.5 hours of polymerization at 69°C and degassing of vinyl chloride which has not reacted, there is recovered with a yield of 80% of pulverulent polymer of viscosity index 80.

There is observed, compared with Example 5, a gain of time of 40 minutes in the polymerization operation.

It is also noted that the presence of crust on the walls of the autoclave is considerably less than used in the conditions of Example 5.

EXAMPLE 7

There is given below by way of comparison, an example of an embodiment of bulk polymerization of vinyl chloride using the two stages of prepolymerization and final polymerization carried out respectively in a prepolymerizer and in a polymerizer.

In a stainless steel prepolymerizer of 3.3 m$^3$ capacity provided with a jacket, maintained at 14°C by circulation of cold water, and a turbine agitator of 610 mm diameter rotating at 190 revolutions per minute, there is introduced:

3 g of active oxygen in the form of 150 g of a solution in butyl phthalate of acetyl cyclohexanesulphonyl peroxide titrated at 2% by weight of active oxygen;

17 g of active oxygen in the form of 850 g of a solution in butyl phthalate of ethyl peroxydicarbonate titrated at 2% by weight of active oxygen;

2300 kg of vinyl chloride monomer.

The prepolymerizer is purged by degassing of 200 kg of vinyl chloride.

By circulation of warm water in the jacket of the prepolymerizer, the temperature of the reaction medium is increased to 69°C which corresponds to a gauge pressure of 11.5 bars in the prepolymerizer. The duration of heating is 45 minutes.

After 35 minutes of prepolymerization at 69°C, the conversion percentage (polymerization degree) being in the region of 12%, the monomer/polymer composition obtained is transferred into a vertical stainless steel polymerizer of 8 m³ capacity, provided with a jacket, maintained at 14°C by circulation of cold water, and a screw agitator rotating at 30 revolutions per minute in which there is previously introduced:

30 g of active oxygen in the form of 1500 g of a solution of acetylcyclohexanesulphonyl peroxide as used in the prepolymerization;

50 g of active oxygen in the form of 2500 g of the solution of ethyl peroxydicarbonate as used for the prepolymerization;

2700 kg of vinyl chloride monomer, and the polymerizer is purged by degassing of 200 kg of vinyl chloride.

By circulation of warm water in the jacket of the polymerizer, the temperature of the reaction medium is increased to 54°C, which corresponds to a gauge pressure of 8 bars in the polymerizer. The duration of heating is 50 minutes.

After 5 hours of polymerization at 54°C and degassing of vinyl chloride which has not reacted, there is recovered with a yield of 80% of a pulverulent polymer of viscosity index 106.

A considerable amount of crust is observed on the wall of the prepolymerizer which renders necessary its cleaning before carrying out another prepolymerization operation.

EXAMPLE 8

The same prepolymerizer and polymerizer as in Example 7 are used.

In the prepolymerizer with the agitator turning at 190 revolutions per minute and the jacket maintained at 69°C by circulation of warm water, there is introduced a solution which is continuously prepared immediately before its arrival in the reaction zone, in the static mixer feeding the prepolymerizer by mixing of:

2300 kg of vinyl chloride monomer previously heated to 70°C by passage through a tubular heat exchanger in which steam is condensed;

20 g of active oxygen in the form of a solution obtained by mixing 150 g of the solution of acetylcyclohexanesulphonyl peroxide and 850 g of the solution of ethyl peroxydicarbonate of which the titres are indicated in Example 7.

At the end of charging, the prepolymerizer is purged by degassing 200 kg of vinyl chloride and the temperature of the reaction medium is 69°C which corresponds to a gauge pressure of 11.5 bars in the prepolymerizer.

After 35 minutes of prepolymerization at 69°C, the conversion percentage being about 12%, the monomer/polymer composition obtained is transferred to the polymerizer with the agitator turning at 30 revolutions per minute and the jacket is maintained at 55°C by circulation of warm water, and there is introduced simultaneously in the polymerizer a solution prepared continuously immediately before its arrival in the reaction zone, in a static mixer feeding polymerizer by mixing of:

2700 kg of vinyl chloride monomer, previously heated to a temperature of 60°C, by passage through a tubular heat exchanger in which water vapor is condensed;

80 g of active oxygen in the form of a solution obtained by mixing 1500 g of a solution of acetylcyclohexanesulphonyl peroxide and 2500 g of the solution of ethyl peroxydicarbonate of which the titres are indicated in Example 7.

At the end of charging, the polymerizer is purged by degassing of 200 kg of vinyl chloride and the temperature of the reaction medium is 54°C which corresponds to a gauge pressure of 8 bars in the polymerizer.

After 5 hours of polymerization at 54°C and degassing of vinyl chloride which has not reacted, there is recovered with a yield of 80% a pulverulent polymer of viscosity index 106.

There is observed, compared with Example 7, a gain in time of 45 minutes in the prepolymerization operation and of 50 minutes in the final polymerization.

It is also noted that the presence of crusts in the wall of the prepolymerizer is considerably less than under the conditions of Example 7, which allows several operations of prepolymerization to be carried out without cleaning.

EXAMPLE 9

The same apparatus is used as in Example 8.

In the prepolymerizer with the agitator rotating at 190 revolutions per minute and the jacket maintained at 69°C by circulation of warm water, there is introduced a solution prepared continuously immediately before arrival at the reaction zone, in a static mixer feeding the prepolymerizer by mixing of:

2185 kg of vinyl chloride monomer previously heated to 70°C by passage through a tubular heat exchanger in which steam is condensed;

20 g of active oxygen in the form of a solution obtained by mixing of 115 kg of vinyl chloride monomer, 150 g of acetylcyclohexanesulphonyl peroxide solution and 850 g of ethyl peroxydicarbonate solution, of which the titres are indicated in Example 7.

At the end of the charging, the prepolymerizer is purged by degassing of 200 kg of vinyl chloride and the temperature of the reaction medium is 69°C, which corresponds to a gauge pressure of 11.5 bars in the prepolymerizer.

After 35 minutes of prepolymerization at 69°C, the polymerization degree being about 12%, the polymer/monomer composition is transferred to the polymerizer with the agitator rotating at 30 revolutions per minute and the jacket is maintained at 55°C by circulation of warm water and, there is introduced simultaneously into the polymerizer a solution prepared continuously immediately before its arrival in the reaction zone, in a static mixer feeding the polymerizer by mixing of:

2565 kg of vinyl chloride monomer previously heated to 60°C by passage through the tubular heat exchanger in which steam is condensed;

80 g of active oxygen in the form of a solution obtained by mixing 135 kg of vinyl chloride monomer, 1500 g of acetylchclohexanesulphonyl peroxide solution and 2500 g of ethyl peroxydicarbonate solution, the titres of which are given in Example 7.

At the end of charging of the polymerizer, the polymerizer is purged by degassing 200 kg of vinyl chloride and the temperature of the reaction medium is 54°C, which corresponds to a gauge pressure of 8 bars in the polymerizer.

After 5 hours of polymerization at 54°C and degassing of vinyl chloride which has not reacted, there is obtained with a yield of 80% a pulverulent polymer of viscosity index 106.

There is observed, compared with Example 7, a gain of time of 45 minutes in the operation of prepolymerization and of 50 minutes in the polymerization operation.

So far as the presence of crust on the wall of the prepolymerizer is concerned, the comments made in Example 8 apply.

EXAMPLE 10

The same apparatus as in Example 8 is used.

Into the prepolymerizer, of which the agitator rotates at 190 revolutions per minute and of which the jacket is maintained at 69°C by circulation of hot water, there is introduced a solution prepared continuously immediately before its arrival in the reaction zone, in a static mixer feeding the prepolymerizer by mixing of:

1955 kg of vinyl chloride monomer previously heated to a temperature of 70°C by passage through a tubular heat exchanger in which water vapor is condensed;

20 g of active oxygen in the form of a solution obtained by mixing 345 kg of vinyl chloride monomer, 150 g of acetylcyclohexanesulphonyl peroxide and 850 g of the solution of ethyl peroxydicarbonate, solutions of which the titres are indicated in Example 7.

At the end of charging, the prepolymerizer is purged by degassing of 200 kg of vinyl chloride. The temperature of the reaction mixture is 69°C which corresponds to a gauge pressure of 11.5 bars in the prepolymerizer.

After 35 minutes of prepolymerization at 69°C, the polymerization degree being about 12%, the monomer/polymer composition is transferred to the polymerizer in which the agitator turns at 30 revolutions per minute and of which the jacket is maintained at 55°C by circulation of warm water, and there is introduced simultaneously in the polymerizer a solution prepared continuously immediately before its arrival in the reaction zone, in the static mixer feeding the polymerizer by mixing of:

2295 kg of vinyl chloride monomer previously heated to 60°C by passage through a tubular exchanger in which steam is condensed;

80 g of active oxygen in the form of solution obtained by mixing 405 kg of vinyl chloride monomer, 1500 g of acetylcyclohexanesulphonyl peroxide solution and 2500 g of ethyl peroxydicarbonate solution, having the titres given in Example 7.

At the end of charging, the polymerizer is purged by degassing of 200 kg of vinyl chloride at a temperature of the reaction medium of 54°C which corresponds to a gauge pressure of 8 bars in the polymerizer.

After 5 hours of polymerization at 54°C and degassing of vinyl chloride which has not reacted, there is recovered with a yield of 80% a pulverulent polymer of viscosity index 106.

There is observed, in comparison with Example 7, a gain in time of 45 minutes in the prepolymerization operation and of 50 minutes in the polymerization operation.

On the subect of the presence of crust on the wall of the prepolymerizer, the same remarks apply as made in Example 8.

EXAMPLE 11

There is given below by way of comparison, an example of copolymerization in bulk of vinyl chloride and vinyl acetate in two stages of prepolymerization and polymerization carried out respectively in a prepolymerizer and a polymerizer.

In a stainless steel prepolymerizer of 200 liters capacity, provided with a jacket maintained at 14°C by circulation of cold water and a turbine agitator rotating at 400 revolutions per minute, there is introduced:

0.26 g of active oxygen in the form of 13 g of a solution in butyl phthalate of acetylcyclohexanesulphonyl peroxide having a titre of 2% by weight of active oxyge;

0.78 g of active oxygen in the form of 39 g of a solution in butyl phthalate of ethyl peroxydicarbonate having a titre of 2% by weight of active oxygen;

135 kg of vinyl chloride monomer.

The prepolymerizer is purged by degassing of 10 kg of vinyl chloride. There is also introduced 5 kg of vinyl acetate.

By circulation of hot water in the jacket of the prepolymerizer, the temperature of the reaction medium is raised to 69°C, which corresponds to a pressure of 11.3 bars in the prepolymerizer. The duration at heating is 45 minutes.

After 40 minutes of prepolymerization at 69°C, the polymerization degree is about 12%. The monomer/polymer composition is transferred into a horizontal stainless steel polymerizer of 500 liters capacity, provided with a jacket maintained at 14°C by circulation of cold water and a frame agitator turning at 30 revolutions per minute, previously purged by degassing of 20 kg of vinyl chloride and in which is introduced:

1.6 g active oxygen in the form of 80 g of the solution of acetylcyclohexanesulphonyl peroxide used for the prepolymerization;

3 g of active oxygen in the form of 150 g of the solution of ethyl peroxydicarbonate used in the prepolymerization;

67.3 kg of vinyl chloride;

2.7 kg of vinyl acetate.

By circulation of hot water in the jacket of the polymerizer, the temperature of the reaction medium is brought to 55°C, which corresponds to a gauge pressure of 8.1 bars in the polymerizer. The duration of heating is 40 minutes.

After 6 hours of copolymerization at 55°C and degassing of the monomer composition which has not reacted, there is recovered with a yield of 81% a pulverulent copolymer of vinyl chloride and vinyl acetate, composed of 98% by weight of vinyl chloride and 2% by weight of vinyl acetate, having an index of viscosity of 97.

There is observed a considerable amount of crust on the wall of the prepolymerizer which makes necessary its cleaning before carrying out another prepolymerization operation.

EXAMPLE 12

The same prepolymerizer and polymerizer are used as in Example 11.

In the prepolymerizer, previously purged by degassing of 10 kg of vinyl chloride, in which the agitator rotates at 400 revolutions per minute and in which the jacket is maintained at 69°C by circulation of hot water, there is introduced a solution prepared continuously immediately before its arrival in the reaction zone, in a static mixer feeding the prepolymerization by mixing of:

A monomeric composition consisting of 125 kg of vinyl chloride and 5 kg of vinyl acetate, previously heated to 70°C by passage through a tubular heat exchanger in which water vapor is condensed;

1.04 g of active oxygen in the form of a solution obtained by mixing 13 g of the solution of acetylcyclohexanesulphonyl peroxide and 39 g of the solution of ethyl peroxydicarbonate of which the titres are indicated in Example 11.

At the end of charging, the temperature of the reaction medium is 69°C, which corresponds to a gauge pressure of 11.3 bars in the prepolymerizer.

After 35 minutes of prepolymerization at 69°C, the polymerization degree being about 12%, the monomer/polymer composition is transferred into the polymerizer previously purged by degassing of 20 kg vinyl chloride of which the agitator rotates at 30 revolutions per minute and of which the jacket is maintained at 57°C by circulation of hot water; then there is introduced in the polymerizer a solution prepared continuously immediately before its arrival in the reaction zone, in a static mixer feeding the polymerizer by mixing:

A monomeric composition consisting of 67.3 kg of vinyl chloride and 2.7 kg of vinyl acetate, previously heated to 60°C by passage through a tubular heat exchanger in which water vapor is condensed;

4.6 g of active oxygen in the form of a solution obtained by mixing 80 g of the solution of acetylcyclohexanesulphonyl peroxide and 150 g of the solution of ethyl peroxydicarbonate of which the titres are mentioned in Example 11.

At the end of charging, the temperature of the reaction medium is 55°C, which corresponds to a gauge pressure of 8.1 bars in the polymerizer.

After 6 hours of copolymerization at 55°C and degassing of the monomeric composition which has not reacted, there is recovered, with a yield of 81%, a pulverulent copolymer of vinyl chloride and vinyl acetate consisting of 98% by weight of vinyl chloride and 2% by weight of vinyl acetate having a viscosity index of 97.

There is observed, in comparison with Example 11, a gain of time of 45 minutes in the prepolymerization operation and of 40 minutes in the final polymerization operation.

It is observed that the presence of crust on the wall of the prepolymerizer is much less than that obtained using the conditions of Example 11 and this allows several prepolymerization operations to be carried out without intermediate cleaning.

We claim:

1. A process for preparing polymers and copolymers of vinyl chloride by bulk polymerization, which comprises feeding to a reaction zone of a vessel maintained at the polymerization temperature ($t_1$) a solution (A) comprising monomeric material to be polymerized and at least one polymerization initiator, solution (A) being prepared by preheating at least 50% of the monomeric material in the absence of catalyst to a temperature ($t_2$) within 20°C of the temperature ($t_1$) and immediately prior to being fed to the reaction zone, mixing the preheated constituent (B) and a solution (C) of the initiator or initiators in an organic solvent including the remainder, if any, of the monomeric material.

2. A process according to claim 1 in which the elapsed time between contact between the constituent B and the solution C and the arrival of the solution A in the reaction zone is not more than 20 seconds.

3. A process according to claim 2, in which said time is not more than 10 seconds.

4. A process according to claim 1 in which the difference between the temperature ($t_1$) and ($t_2$) is not more than 10°C.

5. A process according to claim 1, in which the concentration of polymerization initiator in solution C expressed as active oxygen equivalent is within the range of 0.5% to 7% by weight.

6. A process according to claim 1, in which said concentration is from 0.7% to 4% by weight.

7. A process according to claim 1, in which monomeric material is first prepolymerized to a polymerization degree of from 7% to 15% under agitation at a high speed, transferring the monomer/polymer mixture so obtained to one or more polymerizer vessels in which final polymerization is carried out under agitation at a lower speed, solution (A) being added to the polymerizer vessel after or at the same time as the monomer/polymer mixture.

8. A process according to claim 7, in which the monomeric material is prepolymerized to a polymerization degree from 8% to 12% to obtain said monomer/polymer mixture.

* * * * *